(12) United States Patent
Khan et al.

(10) Patent No.: US 12,277,870 B2
(45) Date of Patent: Apr. 15, 2025

(54) INTERFACE TO NATURAL LANGUAGE GENERATOR FOR GENERATION OF KNOWLEDGE ASSESSMENT ITEMS

(71) Applicant: PROMETRIC LLC, Baltimore, MD (US)

(72) Inventors: Saad Masood Khan, Yardley, PA (US); Jesse Andrew Lewis Hamer, Iowa City, IA (US); Tiago Lima Almeida, Santa Catarina (BR); Charles Foster, Oakland, CA (US); Geoff Converse, Coralville, IA (US); Claudio Souza, Santa Catarina (BR); Lucas Cezimbra, Santa Catarina (BR); Sara Vispoel, Iowa City, IA (US)

(73) Assignee: Prometric LLC, Baltimore, MD (US)

( * ) Notice: Subject to any disclaimer, the term of this patent is extended or adjusted under 35 U.S.C. 154(b) by 354 days.

(21) Appl. No.: 17/809,217

(22) Filed: Jun. 27, 2022

(65) Prior Publication Data
US 2022/0415203 A1    Dec. 29, 2022

Related U.S. Application Data

(60) Provisional application No. 63/215,794, filed on Jun. 28, 2021.

(51) Int. Cl.
*G09B 7/06* (2006.01)
*G06F 40/279* (2020.01)
*G06F 40/30* (2020.01)

(52) U.S. Cl.
CPC ............. *G09B 7/06* (2013.01); *G06F 40/279* (2020.01); *G06F 40/30* (2020.01)

(58) Field of Classification Search
CPC .......... G09B 7/06; G09B 5/02; G06F 40/279; G06F 40/30; G06F 40/56
See application file for complete search history.

(56) References Cited

U.S. PATENT DOCUMENTS

| | | |
|---|---|---|
| 8,517,738 B2 | 8/2013 | Sheehan et al. |
| 8,838,659 B2 | 9/2014 | Tunstall-Pedoe |

(Continued)

OTHER PUBLICATIONS

International Search Report and Written Opinion of International Patent Application No. PCT/US2022/73192, mailed Dec. 2, 2022.

(Continued)

*Primary Examiner* — Thuykhanh Le
(74) *Attorney, Agent, or Firm* — Dorsey & Whitney LLP

(57) ABSTRACT

An item generation interface may generate knowledge assessment items directed a subject area based on a set of model items collectively directed to the subject area. The item generation interface may group the set of model assessment items into a plurality of similar item groups using numeric features corresponding to the model assessment items. Similar item groups may include model assessment items covering conceptually similar concepts within the subject area. A conditioning input may be generated for each of the item groups based on the numeric features corresponding to the model assessment items in the item group. Responsive to providing the conditioning inputs to a transformer-based natural language generation model, the item generation interface may receive raw assessment items from the transformer-based natural language generation model. Knowledge assessment items may be identified from the raw assessment items.

18 Claims, 9 Drawing Sheets

(56) References Cited

U.S. PATENT DOCUMENTS

| | | | |
|---|---|---|---|
| 9,082,309 | B1 | 7/2015 | Fuka |
| 9,098,492 | B2 | 8/2015 | Tunstall-Pedoe |
| 9,858,828 | B1 | 1/2018 | Fuka |
| 10,249,207 | B2 | 4/2019 | Solomon et al. |
| 10,504,268 | B1 | 12/2019 | Huang et al. |
| 10,504,376 | B2 | 12/2019 | Nibe et al. |
| 10,664,862 | B1* | 5/2020 | Szulczewski ...... G06Q 30/0251 |
| 2003/0216913 | A1* | 11/2003 | Keely ................ G06V 30/1423 704/235 |
| 2015/0324459 | A1* | 11/2015 | Chhichhia ................ G06N 5/02 706/12 |
| 2016/0162456 | A1* | 6/2016 | Munro ............. G06F 16/24532 704/9 |
| 2017/0169829 | A1* | 6/2017 | Celikyilmaz ........... G10L 17/04 |
| 2017/0177660 | A1* | 6/2017 | Chang ................ G06F 16/2425 |
| 2017/0371861 | A1* | 12/2017 | Barborak ............ G06F 40/211 |
| 2018/0101598 | A1* | 4/2018 | Allen .................... G06F 40/268 |
| 2018/0336183 | A1* | 11/2018 | Lee ........................ G06N 5/022 |
| 2019/0272325 | A1* | 9/2019 | Korn ........................ G10L 13/08 |
| 2019/0378429 | A1* | 12/2019 | Panuganty ............. G06F 40/10 |
| 2020/0193317 | A1* | 6/2020 | Cha ........................ G06N 20/00 |
| 2020/0218988 | A1* | 7/2020 | Boxwell .................. G06N 5/02 |
| 2020/0334331 | A1* | 10/2020 | Cason .................... G06N 20/00 |
| 2020/0342054 | A1* | 10/2020 | Cason .................... G06F 40/211 |
| 2020/0356729 | A1* | 11/2020 | Duan ..................... G06N 3/044 |
| 2020/0372106 | A1* | 11/2020 | Liu ........................ G06N 20/00 |
| 2020/0387572 | A1* | 12/2020 | Allen ...................... G06F 40/30 |
| 2020/0410050 | A1* | 12/2020 | Cason .................... G06F 40/30 |
| 2021/0110895 | A1* | 4/2021 | Shriberg ................ G16H 10/20 |
| 2021/0149994 | A1* | 5/2021 | Kim ..................... G06F 40/216 |
| 2021/0183484 | A1* | 6/2021 | Shaib ................... G06F 40/295 |
| 2021/0295822 | A1* | 9/2021 | Tomkins ............. G06F 16/3338 |
| 2021/0366303 | A1* | 11/2021 | Chadwick ................ G09B 7/08 |
| 2021/0383711 | A1* | 12/2021 | Panuganty ........... G06F 40/143 |
| 2022/0100676 | A1* | 3/2022 | Yan ........................ G06N 3/045 |
| 2022/0108195 | A1* | 4/2022 | Kehler ................... G06N 3/047 |
| 2022/0121824 | A1* | 4/2022 | Hu ........................... G06F 40/30 |
| 2022/0188661 | A1* | 6/2022 | Tappin ................. G06F 16/248 |
| 2022/0309356 | A1* | 9/2022 | Singh ...................... G06N 5/02 |
| 2022/0415203 | A1* | 12/2022 | Khan ...................... G09B 7/06 |
| 2023/0419044 | A1 | 12/2023 | Hamer et al. |

OTHER PUBLICATIONS

International Search Report and Written Opinion dated Nov. 21, 2023 in connection with International Patent Application No. PCT/US2023/031447, 9 pages.

Khan, Saad M. et al. "Catalog: An Educational Content Tagging System," 14th Intl Conf on Educational Data Mining, EDM 2021, 4 pages.

* cited by examiner

INTERFACE TO NATURAL LANGUAGE GENERATOR FOR GENERATION OF KNOWLEDGE ASSESSMENT ITEMS

CROSS-REFERENCE TO RELATED APPLICATIONS

The present application claims the benefit of priority to U.S. Provisional Patent Application No. 63/215,794, filed Jun. 28, 2021, entitled "INTERFACE TO NATURAL LANGUAGE GENERATOR FOR GENERATION OF KNOWLEDGE ASSESSMENT ITEMS", the disclosure of which is incorporated herein by reference in its entirety.

BACKGROUND

Natural Language Generators (NLGs) may be used to generate a wide variety of content. However, because NLGs may be trained using large corpuses of text data across a wide variety of content domains, it may be difficult to use NLGs to generate assessment items (e.g., test questions) in technical areas or other specific subject matter areas where terms have specific, narrow meanings. Accordingly, generating test questions and other items configured to measure knowledge in specific subject areas or content domains may be difficult.

SUMMARY

An item generation interface may generate knowledge assessment items directed a subject area based on a set of model items collectively directed to the subject area. The item generation interface may group the set of model assessment items into a plurality of similar item groups using numeric features corresponding to the model assessment items. Similar item groups may include model assessment items covering conceptually similar concepts within the subject area. A conditioning input may be generated for each of the item groups based on the numeric features corresponding to the model assessment items in the item group. Responsive to providing the conditioning inputs to a transformer-based natural language generation model, the item generation interface may receive raw assessment items from the transformer-based natural language generation model. Knowledge assessment items may be identified and/or developed from the raw assessment items.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Background

Figure 1:
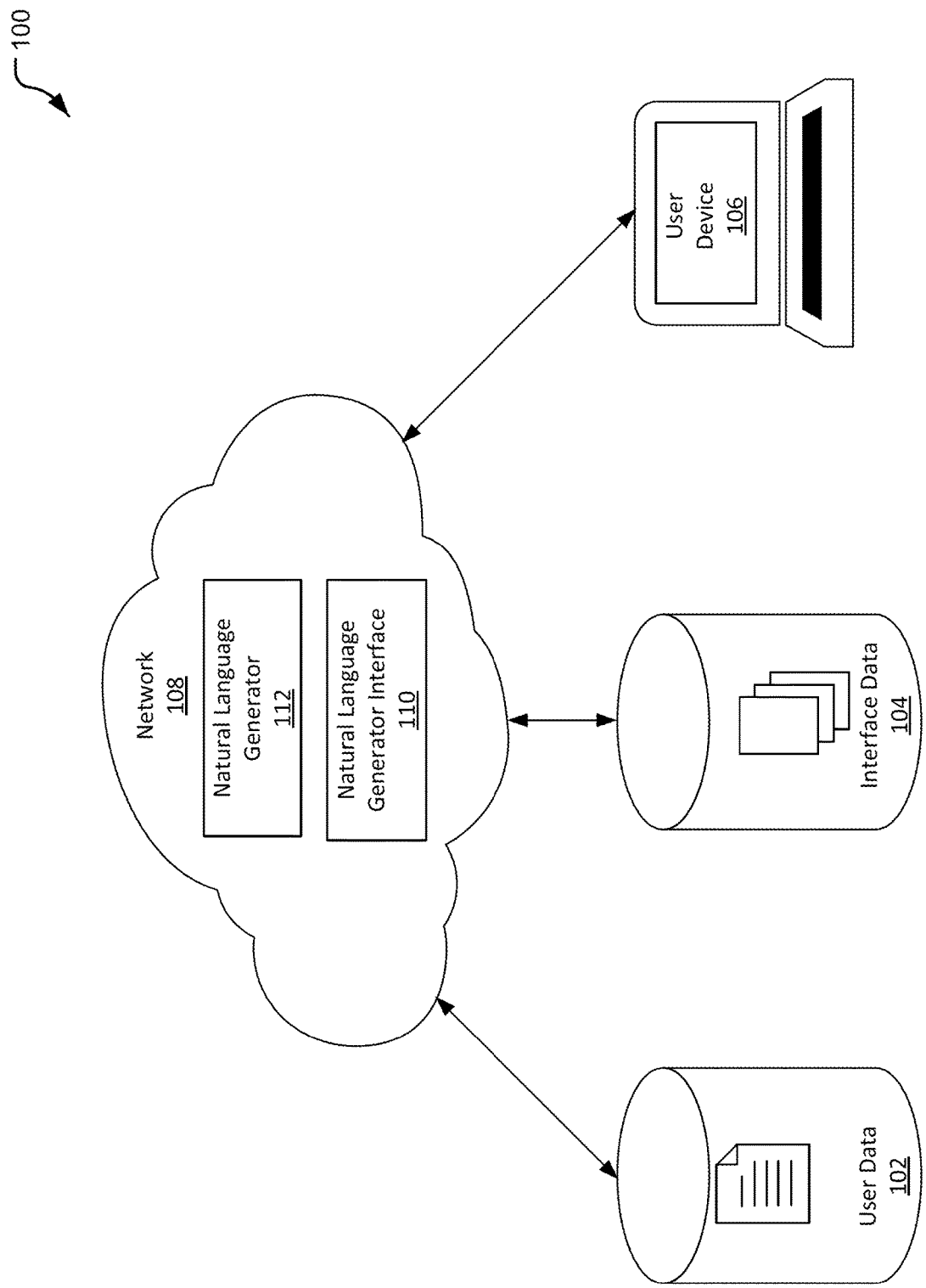
FIG. 1 illustrates an example system including a NLG interface providing for generation of knowledge assessment items using a NLG accessible over a network in accordance with some embodiments of the disclosure.

Accurate measurement of a person's level of knowledge or of a largely mental skill is highly important in many areas. Such testing is not only important in testing the various basic competences that a community and country hope its citizens will acquire though basic education, as well as the more specialized competences that are necessary for doctors, engineers, and other providers involved in health care, persons who are pilots, drivers or operators of equipment where specific knowledge and skills are necessary to ensure safety or in a variety of occupations where we customarily measure skills and knowledge to measure a desired level of competence. Although some ability to objectively measure neural activity now exists, physical sensors to directly measure many important forms of knowledge and skills are not available. Accordingly, measurements of these kind require assessment tools that are heavily based on presentations of text and images that require responses from tested subjects. These assessment tools are designed to provide data usable to quantify the knowledge and skill of individuals tested.

Producers of standardized tests, licensing exams, and other assessment tools may face difficulties in generating the large volume of assessment items needed to ensure test security, particularly when tests may be given to many individuals at different locations and/or at different times (e.g., asynchronous distribution). For example, for online tests taken asynchronously, reuse of testing items may incentivize earlier test takers to provide testing items to later test takers, such that the later tests may not accurately assess the knowledge of individual test takers. Further, other entities, such as those providing preparation for such exams, may face difficulties in generating practice testing items which mirror actual testing items both in subject matter coverage and structure. Providing practice items that closely mirror, but are not identical to, already released testing items provides test takers with more robust preparation, as the test takers do not encounter the same questions multiple times in practice situations. However, generating large volumes of testing items to fulfill such requirements may utilize subject matter experts specially trained in authoring testing items, which may naturally limit the number of testing items available. Because of the increasing need to rely on these testing items to do important knowledge and skill measurements in more areas, meeting the need for good test items is increasingly a challenge. Ineffective test items may lead to ineffective measurements.

Machine Learning and Artificial Intelligence models may provide useful tools for generating high volumes of knowledge assessment items (e.g., standardized test questions) for practice and learning applications, delivery of varied tests to asynchronous test takers, and other applications. However, models pre-trained for specific tasks and/or subject matters may be time consuming to develop, and may require large volumes of data to provide useful output. Further, in subject areas which change over time, the burden of generating new models to ensure new or different concepts are represented in generated items may outweigh benefits of using language generation models to generate knowledge assessment items. For example, professional licensure examinations may be updated on a monthly, quarterly, or yearly basis to reflect updated regulations, best practices, and other developments.

Pre-trained models (e.g., models trained on very large text corpuses) may be useful to reduce or remove barriers related to training models for specific tasks. Such pre-trained Natural Language Generation (NLG) models may be utilized to generate various linguistic structures. These NLG models may use unsupervised language modeling, meaning that the NLG models may perform various tasks and may generate language in a variety of content domains. For example, NLG models may mimic conditioning input in both form and content to generate literary passages on given topics, computer code, summarize text, answer questions, etc. However, because these models are trained on large corpuses of data, it may be difficult to generate meaningful content in very specific content domains. Accordingly, using pre-trained NLG models to generate large volumes of factually accurate, semantically correct, and appropriately difficult items useful in assessing knowledge in various focused subject areas is difficult.

Generating meaningful, technically correct, and semantically correct output is important when generating knowledge assessment items, as technically incorrect question stems, confusing answer choices, or other issues may render the items ineffective to measure knowledge of test takers in the subject area. For a subject area covering several discrete concepts, providing a large volume of model items to a natural language generation model in a randomized order may cause the natural language generation model to generate knowledge assessment items that are ineffective to measure knowledge of test takers across the discrete concepts of the subject area. This is because while natural language generation models using next token prediction may generally process individual inputs (e.g., a single model item) bi-directionally, the inputs may have reduced weight based on their order in the input. Accordingly, some model items provided to the natural language generation model may be given substantially more weight than other inputs, such that the generated model item may more closely mirror one model item, regardless of whether the model item is representative of the set of model items as a whole. Further, where the model items provided as input are conceptually further apart from one another, the natural language generation model predicts next tokens with lower probabilities, which may result in nonsensical or technically incorrect output. It may be similarly difficult to generate assessment items of multiple cognitive types (e.g., recall and application questions) and assessment items spanning several difficulty levels. However, to, for example, generate unique tests for asynchronous test takers, a large volume of assessment items covering all concepts to be tested, with varying cognitive types and difficulty levels is often needed.

For example, to generate knowledge assessment items for a test of electricity and magnetism concepts in physics directly using a natural language generation model, a user may provide the natural language generation model with a conditioning input consisting of model items covering several concepts and/or concept areas, such as electronic circuits, magnetic fields, electrostatics, and electromagnetism. Where the conditioning input provides a model item directed to electronic circuits in a position given more weight by the NLG, generated items are more likely to cover electronic circuits than other concepts where model items directed to the concept are provided elsewhere in the conditioning input. Further, because the model items may be conceptually far apart (e.g., include different wording and test different concepts), the natural language generation model is more likely to make predictions that are nonsensical or technically incorrect. Accordingly, generating knowledge assessment items in this manner using a natural language generation model may still involve subject matter experts for review and substantial modifications to transform items generated by the natural language generation model into items usable to assess knowledge of test takers in a subject area.

Interface Overview.

A NLG interface as disclosed herein may assess a set of model knowledge assessment items directed to a subject area to generate conditioning inputs to a NLG that are more likely to result in generation of useful knowledge assessment items by the NLG. Useful knowledge assessment items may, individually, be technically accurate, coherent, include appropriate answer choices for multiple choice questions (e.g., keys and distractors), and be at an appropriate level for a given assessment (e.g., at a grade appropriate reading level). Collectively, the NLG interface may provide a large volume of knowledge assessment items that are unique when compared to one another and to model items, span each concept to be tested in a given subject matter area, include items of multiple cognitive types (e.g., recall and application items), and include items spanning an acceptable difficulty range. Ultimately, the NLG interface may provide large volumes of content useful in, for example, generating unique assessments for individual test takers, providing large volumes of practice content, etc.

The NLG interface may compensate for the architecture of the NLG by, for example, identifying semantically and conceptually similar items in the set of model knowledge assessment items and creating conditioning inputs for groups of similar items. In this manner, the model items provided in a conditioning input are conceptually closer together, or more similar, such that the NLG may more accurately predict next tokens in a generated item. Items may be grouped based on several factors including, in some examples, content coverage, difficulty, cognitive type, simultaneously. Accordingly, the NLG interface may produce sets of generated items spanning concepts, difficulty distributions, cognitive type, and other metrics as desired by users. Further, the NLG interface may order inputs corresponding to model items forming a conditioning input such that model items more representative of the group of model items are more heavily weighted by the NLG in comparison to model items that may be conceptual outliers. The NLG interface may provide conditioning input to the NLG for each of the conceptual groups identified by the interface such that items generated by the NLG conceptually cover the breadth of the subject area covered by the original set of model items provided by the user to the interface. Accordingly, the NLG interface may generate large volumes of technically and lexically accurate assessment items spanning provided concepts, difficulty, and cognitive types, such that the generated items are useful in assessing the knowledge of target test-takers in a given content area. The NLG interface also provides significantly more items than could realistically be provided by human content writers with subject matter expertise, improving assessment security and allowing assessment creators to keep pace with demands for varied assessments covering defined subject areas with similar degrees of difficulty such that results between test takers assessed with different assessments are comparable even where the assessments are not item by item identical.

In some examples, the NLG interface may provide an interface to a user for creation of long-form passage content. For example, at the beginning of passage generation, the user may specify a title of a passage to create, in addition to selecting other features, such as a topic, reading level, and passage type (e.g., informative, literary, poetry, and the like). The user may then generate a passage one paragraph at a time. For example, the user may have the option to provide, prior to each paragraph generation, a few words describing what the paragraph should be about. To provide such information to an NLG, the NLG interface may seed conditioning inputs with a model passage which adheres to the passage type and reading level chosen by the user. As the user generates paragraphs, each successive paragraph may be appended to the end of the conditioning input so that passage continuity is maintained. In some examples, if the user generates enough paragraphs to exceed the length limit of the conditioning input, paragraphs may be removed from the conditioning input, starting from the first paragraph of the model passage. When the user is satisfied with the generated passage, the passage may be saved to a storage location for later use and/or retrieval.

In some examples, the NLG interface may provide an interface to a user to generation of items using custom passage stimuli. For example, the custom passage used as a stimulus may serve as either a model for the content of generated items or as reference material, where items may be generated explicitly referencing the custom passage (e.g., for reading comprehension type questions). To use the NLG interface in this way, a set of model assessment items may be added to the first portion of the conditioning input. The items may be used to control the structure, style, difficulty, and other characteristics of generated items. The custom passage may then be appended to the end of the conditioning input, and the conditioning input may be completed by instructing the NLG to write an assessment item pertaining to the given passage. Depending on the phrasing of the instruction, the NLG interface may control whether generated items make explicit reference to the generated paragraph of whether the generated items make use of information in the custom passage.

In some embodiments, the NLG interface may also provide an interface to a user for editing and refining items generated by the NLG responsive to the conditioning inputs created by the interface. For example, the NLG interface may provide raw items generated by the NLG to a user device via a user interface at the user device. The user interface may allow the user to change aspects of a raw item and provide the edits to the interface to generate the remainder of the item based on the edits. For example, the NLG interface may update the conditioning input originally provided to the NLG to generate the raw item and provide the updated conditioning input to the NLG to re-generate the remainder of the item. Accordingly, items generated by the NLG may be updated or refined via the interface instead of being wholly discarded, saving additional resources in generating large volumes of knowledge assessment items.

Turning now to the figures, FIG. 1 illustrates an example system 100 including a NLG interface 110 providing for generation of knowledge assessment items using a NLG 112 accessible over a network 108 in accordance with some embodiments of the disclosure. As shown in FIG. 1, the system may include a NLG interface 110 and a NLG 112 accessible by a user device 106 via a network 108. The NLG interface 110 may also access data, such as user data 102 and/or interface data 104 via the network 108.

Generally, the user device 106 may be a device belonging to an end user, such as a test creator, educational institution, or other entities or users accessing the system 100 to generate knowledge assessment items. In various embodiments, the user device 106 may also be a device belonging to an entity or individual generating and refining knowledge assessment items on behalf of other entities, such as a subject matter expert. In some implementations, many user devices 106 may be provided with access to the NLG interface 110 to generate knowledge assessment items. Where multiple user devices 106 access the NLG interface 110, the user devices 106 may be provided with varying permissions, settings, and the like, and may be authenticated by an authentication service prior to accessing the NLG interface 110.

The NLG interface 110 may receive data, instructions, and other communications from the user device 106 (and other user devices) to obtain knowledge assessment items from the NLG 112. For example, the user device 106 may provide a plurality of model knowledge assessment items (or instructions for accessing a plurality of model knowledge assessment items from, for example, user data 102) intended to assess knowledge of a subject area and request a plurality of newly generated knowledge assessment items to assess knowledge in the same subject area from the NLG 112. The NLG interface 110 may use the data and instructions provided by the user device 106 to format input to the NLG 112 to provide high volumes of useful output from the NLG 112 to the user device 106. For example, the NLG interface 110 may format various inputs to the NLG 112 to generate knowledge assessment items that are technically accurate and cover the breadth of the subject area such that the knowledge assessment items are usable in testing environments.

The NLG 112 may be a pre-trained natural language generation model (e.g., a pipeline of pre-trained natural language generation models) trained using one or more large text corpuses covering a variety of subject areas, text types, etc. In some implementations, the NLG 112 may be a transformer based model using next token prediction to generate output. For example, and without limitation, the NLG 112 may be implemented by the T5 model or any of the GPT series models. The NLG 112 may further be implemented by or utilize other decoder only transformer based natural language models, encoder only transformer based models, encoder/decoder transformer based natural language models, etc. In various embodiments, the NLG 112 may be accessed via an application programming interface (API) or other input methods or interfaces of the NLG 112. Other technical features of the NLG 112 are described further herein.

The NLG interface 110 generally receives model knowledge assessment items from a user and analyzes the model knowledge assessment items to generate conditioning inputs for the NLG 112 instructing the NLG 112 to generate items covering the same or a similar conceptual scope as the model knowledge assessment items. For example, in various embodiments, the NLG interface 110 may generate numeric representations of model knowledge assessment items (e.g., multidimensional feature vectors or other encodings) and may group or cluster the model knowledge assessment items based on their numeric representations into groups of conceptually similar items. The NLG interface 110 may determine a centroid or prototype numeric representation for each of the groups of similar items. The NLG interface may then produce conditioning input for each group of similar items by ordering the model items such that items closer to the centroid or prototype item appear before items further from the centroid or prototype item. Distance between a model item and the centroid or prototype item may be determined by calculating a difference between the numeric representation of the model item and the centroid. Accordingly, model items more representative of the group of model items as a whole are considered by the NLG 112 first, such that generated knowledge assessment items are more likely to be representative of the group of model items as a whole. The generated items may then be provided to the user device 106, stored in a central location, or sent to another device based on preferences of the user.

In various implementations, the NLG interface 110 may include components performing additional functions, such as performing initial checks of the items generated by the NLG 112 before providing the items to the user. For example, the NLG interface 110 may include components checking that items generated by the NLG 112 meet basic length requirements and are not duplicates of items provided in the set of model items. The interface 110 may also allow for editing of items, and rating of items generated by the NLG 112 in various embodiments. For example, the interface 110 may provide a user interface at the user device 106 allowing for a user to give positive or negative feedback (e.g., through an "upvote/downvote" or "thumbs up/thumbs down" option). Such an interface may also allow for a user to, for example remove answer choices for multiple choice questions in a generated item and request generation of new answer choices to replace the removed choices in the generated item.

In various implementations, the user device 106 and/or additional user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or appliance. Generally, the user device 106 may include one or more processors, such as a central processing unit (CPU) and/or graphics processing unit (GPU). The user devices may generally perform operations by executing executable instructions (e.g., software) using the processor(s).

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Various components of the system 100 may communicate using different network protocols or communications protocols based on location. For example, the NLG interface 110 and the NLG 112 may be hosted within a cloud computing environment and may communicate with each other using communication and/or network protocols used by the cloud computing environment.

Examples described herein may include storage devices, such as one or more databases, storing data such as user data 102 and/or interface data 104. Such storage devices may be databases, servers, or other repositories of data accessible via the Internet or other network 108. User data 102 and/or interface data 104 may be stored across more than one physical device and may, in some implementations, include storage components and devices belonging to multiple entities, users, or third parties.

User data 102 may include, for example, sets of model knowledge assessment items covering various subject areas, generated knowledge assessment items, content maps corresponding to sets of model knowledge assessment items, writing guidelines corresponding to sets of model knowledge assessment items, metadata regarding model knowledge items in the sets of model knowledge assessment items, and additional user settings. Such user data 102 may be used by the NLG interface 110 to produce conditioning inputs meeting user specifications or to ensure that items generated by the NLG 112 meet user specifications. For example, user data 102 may include user-provided metadata such as item topic categorization, key and distractor labels, item cognitive type (e.g., recall, application, etc.), and difficulty metrics (e.g., p-value and point biserial) for each item in a set of model assessment items. Such metadata may be used by the NLG interface 110 to provide a variety of assessment items. For example, the NLG interface 110 may, in some embodiments, use difficulty metrics to ensure that generated items are of a similar difficulty level or span a desired range of difficulty levels. Similarly, cognitive type metadata may be used by the NLG interface 110 to provide a user with generated items covering several cognitive types for use in assessments.

In some examples, a content map or test plan may be stored as user data 102 and may provide information on concepts represented by a set of model knowledge assessment items as well as how such concepts are interrelated. For example, a content map formatted as a tree may provide a hierarchical contextual representation of concepts covered by a set of model knowledge assessment items. The content map may provide information about interrelated concepts. For example, concepts that have a common parent concept may be closely related, while concepts that share no ancestors in the content map may be conceptually unrelated. The NLG interface 110 may use such information when, for example, forming clusters of similar items within a set of model knowledge items to ensure the concepts intended to be covered by a set of model knowledge assessment items are included in the generated items. In some examples, user data 102 may also include metadata for each model item in the set of model knowledge assessment items indicating where the model items fit within a conceptual map (e.g., which concepts are tested by the item).

Interface data 104 may include instructions used by the NLG interface 110, previously used conditioning inputs, user feedback correlated with previously used conditioning inputs, and the like. Interface data 104 may also include various parameters used by the NLG interface 110, such as a number of clusters of similar items to use in the clustering step, specifications of the interface of the NLG 112, etc. In some implementations, interface data 104 may include "default settings" for various parameters of the NLG interface 110 which may be updated by users in some situations. For example, a user may update the number of clusters of similar items to better fit a particular set of model assessment items. The user may also update, for example, which version or size of the NLG 112 is used, in some embodiments.

Components of the system 100 shown in FIG. 1 are exemplary and may vary in some embodiments. For example, in some embodiments, the NLG interface 110 may be distributed across multiple computing elements, such that components of the NLG interface 110 communicate with one another through the network 108. Further, in some embodiments, computing resources dedicated to the NLG interface 110 may vary over time based on various factors such as usage of the NLG interface 110.

Interface Components.

Figure 2:
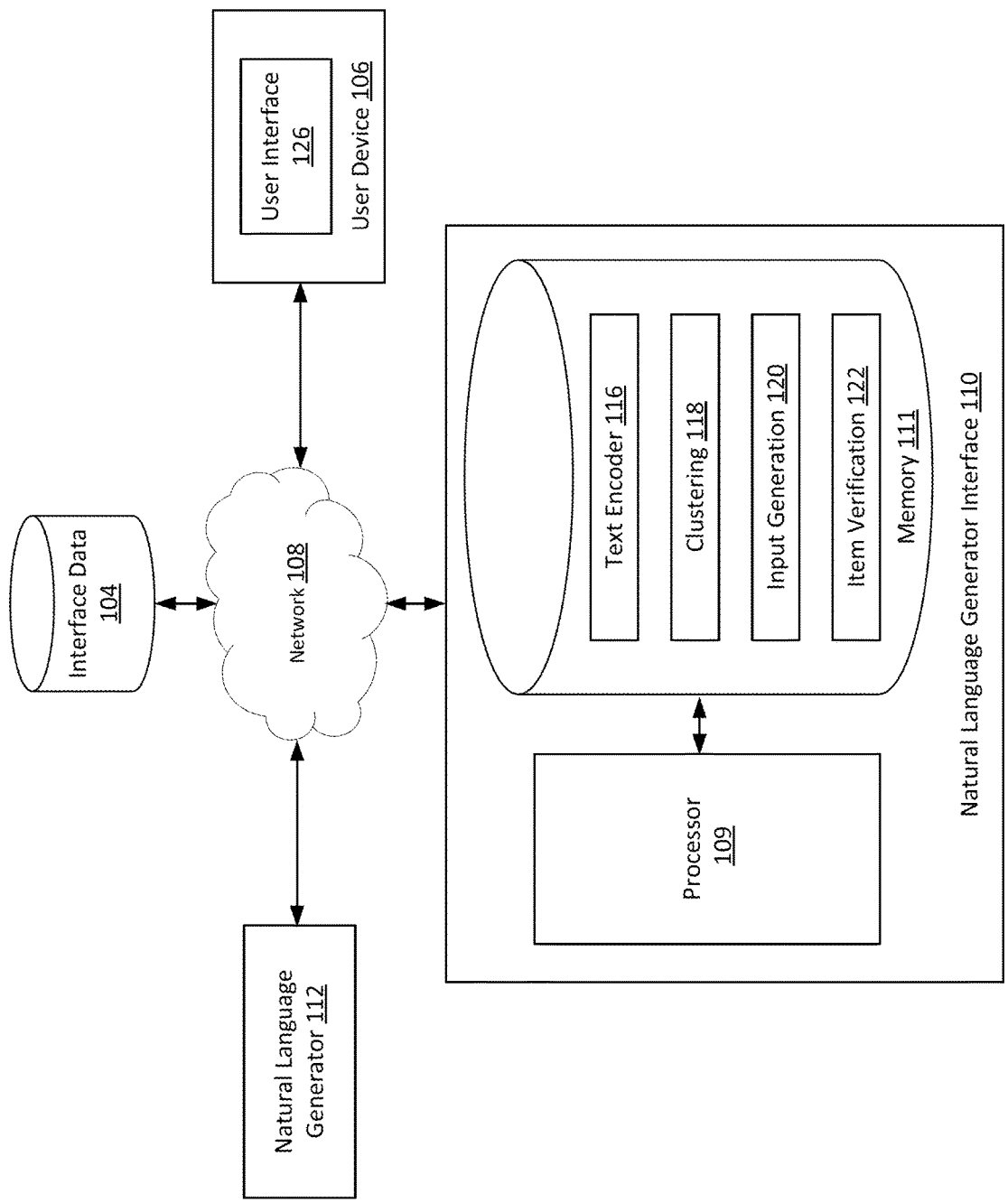
FIG. 2 illustrates a diagram of an example NLG interface in accordance with some embodiments of the disclosure.
Figure 3:
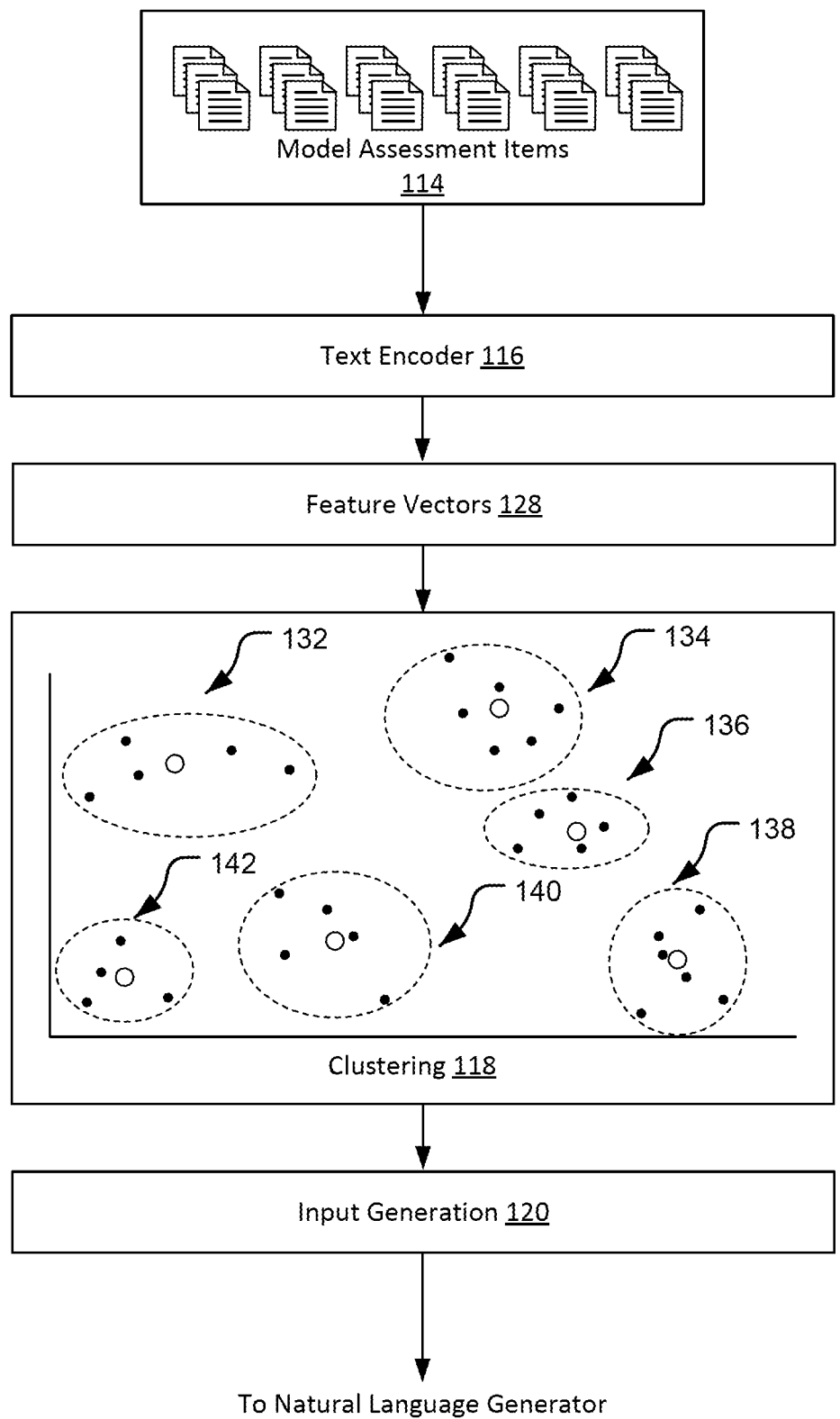
FIG. 3 illustrates a diagram of example components of a NLG interface in accordance with some embodiments of the disclosure.

FIG. 2 illustrates a diagram of an example NLG interface 110 in accordance with some embodiments of the disclosure. The NLG interface 110 includes several logical sub-components, including a text encoder 116, clustering 118, input generation 120, and item verification 122. The NLG interface 110 may generally receive model assessment items 114 (as shown in FIG. 3) and encode the model assessment items 114 using the text encoder 116 to generate numeric representations of the model assessment items 114. Clustering 118 may cluster, classify, or otherwise group the numerical representations of the model items 114. Input generation 120 may format input to the NLG 112 to provide the NLG 112 with instructions to generate assessment items for the groups or clusters generated by clustering 118. Item verification 122 may perform checks of assessment items generated by the NLG 112 and items passing such checks may be provided to a user or communicated to a location (e.g., storage) as generated assessment items. The NLG interface 110 may access various data via network 108, such as interface data 104, to perform its various functions.

As described above, the user device 106 may be a computing device associated with an end user or other user generating knowledge assessment items. The NLG interface 110 may communicate with the user device 106 over the network 108 to provide a user interface 126 to the NLG interface 110. The user interface 126 may allow a user to provide requests to the NLG interface 110 and to view and interact with items generated by the NLG 112 based on conditioning input generated by the NLG interface 110. In various embodiments, the user interface 126 may be implemented as a React, Javascript-based interface for interaction with the NLG interface 110. The user interface 126 may provide instructions to the NLG interface 110 to generate knowledge assessment items based on a set of model knowledge assessment items. The instructions may include, in various embodiments, location information for the set of model knowledge assessment items, content maps including concepts covered by the set of model knowledge assessment items, specifications for the generated items, metadata pertaining to the model knowledge assessment items, and other information used by the NLG interface 110 and/or the NLG 112. The user interface 126 may also display generated items and allow for a user to edit generated items or provide additional information about the generated items. For example, the user interface 126 may display a question stem and answer choices for a generated item and allow the user to edit the question stem and regenerate answer choices based on the edited question stem, choose keys and distractors from the answer choices, rate or tag the generated item, and the like.

In various implementations, the NLG interface 110 may include or utilize one or more hosts or combinations of compute resources, which may be located, for example, at one or more servers, cloud computing platforms, computing clusters, and the like. Generally, the NLG interface 110 is implemented by compute resources including hardware for memory 111 and a processor 109. For example, the NLG interface 110 may utilize or include one or more processors, such as a CPU, GPU, and/or programmable or configurable logic. In some embodiments, various components of the NLG interface 110 may be distributed across various computing resources, such that the components of the NLG interface 110 communicate with one another through the network 108 or using other communications protocols. For example, in some embodiments, the NLG interface 110 may be implemented as a serverless service, where computing resources for various components of the NLG interface 110 may be located across various computing environments (e.g., cloud platforms) and may be reallocated dynamically and automatically according to resource usage of the NLG interface 110. In various implementations, the NLG interface 110 may be implemented using organizational processing constructs such as functions implemented by worker elements allocated with compute resources, containers, virtual machines, and the like.

The memory 111 may include instructions for various functions of the NLG interface 110 which, when executed by processor 109, perform various functions of the NLG interface 110. Similar to the processor 109, memory resources utilized by the NLG interface 110 may be distributed across various physical computing devices.

In various embodiments, the memory 111 may include instructions implementing a text encoder 116 when executed by the processor 109. In some embodiments, the memory 111 may include instructions for full functionality of a text encoder 116 while, in other embodiments, the memory 111 may include instructions for communicating with a pre-configured text encoder to encode model knowledge assessment items. The text encoder 116 may also, in some implementations, augment text encodings generated by a pre-configured text encoder to include additional specifications for test items, such as admissible or target lexical metric ranges such as type-token ratio, Flesch Reading Ease, and Coleman-Liau Index.

In an exemplary implementation, the text encoder 116 instructions stored by the memory 111 may cause the processor 109 to transmit model knowledge assessment items to a text encoder (e.g., the USE model) to generate multidimensional feature vectors representing each of the model knowledge assessment items. The text encoder 116 instructions may further augment the multidimensional feature vectors to add additional dimensions representing the specifications provided by the user. The specifications may, in some implementations, be calculated for each of the model assessment items, and the calculated value may be appended to the multidimensional feature vector. Further, user-provided or derived metadata about individual items (e.g., difficulty level, topic categorization, item cognitive type) may be appended to the multidimensional feature vectors in various embodiments. The above exemplary implementation is provided as an example and other embodiments are contemplated within the scope of this disclosure. For example, in various embodiments, other text encoders may be used, including custom text encoders included in the text encoder 116 instructions. Further, other types of numeric encodings or representations may be used to represent the model knowledge assessment items.

In various embodiments, the memory 111 may include instructions implementing clustering 118 when executed by the processor 109. Clustering 118 may generally group model items into groups or clusters using numeric representations of the model items, such as the numeric representations generated by the text encoder 116. In exemplary embodiments, instructions for clustering 118 may include instructions to perform k-means clustering on the numeric representations of the model items. Such clustering may include symbolically mapping the numeric representations in a multidimensional space, calculating centroids or prototypes for a number of clusters, and assigning model items to clusters based on proximity of the numeric representations of the items to the centroids in the multidimensional space. Though k-means clustering is described above, the instructions implementing clustering 118 may use other methods to group model knowledge assessment items. For example, instructions for clustering 118 may implement a classifier trained to place items into predetermined groups. In various embodiments, clustering 118 may use fully unsupervised learning or may be configured to take into account predetermined class labels. In any implementation of clustering 118, the items may be placed into subgroups based on semantic and lexical similarities identified based on the numeric representations of the model items, which generally results in more meaningful and accurate groupings than those that may be developed based on reviewing only text of the model knowledge assessment items. For example, clustering 118 may group items based on all information included in, for example, an encoding vector. Accordingly, clustering may group items based on several metrics at the same time. For example, multidimensional feature vectors may allow for clustering based on difficulty, lexical metrics (e.g., type-token ratios, calculated Flesch Reading Ease, and the like), questions structure, and concepts tested in items in one operation.

In various embodiments, the memory 111 may include instructions implementing input generation 120 when executed by the processor 109. The instructions for input generation 120 generally create conditioning input to transmit to a NLG 112 using text of the model assessment items and information generated by clustering 118 including, in some examples, groupings of model knowledge assessment items, centroids for the groupings or clusters identified through clustering 118, and numeric representations of the model knowledge assessment items. Input generation 120 may generally format conditioning input for each grouping of the model items and provide each conditioning input to the NLG 112 in turn to generate knowledge assessment items responsive to the conditioning input. In some implementations, input generation 120 may also incorporate feedback from other components of the NLG interface 110 to generate or update conditioning inputs to the NLG 112. For example, in some embodiments, a user interface may provide the generated items to the user device and the user interface may provide a mechanism for users to provide feedback on generated items. In such embodiments, input generation 120 may include instructions to reorder inputs responsive to continued negative feedback about items generated using a particular conditioning input. Similarly, input generation 120 may receive user edits to text of generated items and may augment the conditioning input with the edited portions of a generated item to regenerate the item.

Generally, a conditioning input may include input corresponding to each model knowledge assessment item in a group or cluster of model knowledge assessment items. Such input may be formatted based on a specific API or interface of the NLG 112 but may generally include a series of characters representing the text and formatting of a model knowledge assessment items. Such inputs are generally evaluated by the NLG 112 as examples, where the NLG 112 evaluates the inputs for patterns, similarities, and other shared characteristics of the inputs before generating a new knowledge assessment item mirroring the inputs. This approach may be referred to as "few-shot learning" and is described in greater detail with respect to FIG. 4 herein.

Input generation 120 may include instructions for generating the individual inputs corresponding to the model items and ordering the individual inputs to form a conditioning input. For example, input generation 120 may parse tokens forming each of the model items within a cluster and then concatenate the tokens to form a conditioning input of input tokens. Input generation 120 may also format generated conditioning input according to the interface provided by the NLG 112 and communicate the conditioning input to the NLG 112. For example, input generation 120 may provide a terminating character or token where used by the NLG 112 and/or may provide a token limit for generated items with the conditioning input. In some examples, input generation 120 may provide a description of the example task or other information used by the NLG 112.

In some embodiments, input generation 120 may order inputs corresponding to the model items based on a distance between the numerical representations of the model items and the centroid or prototype of the cluster in the multidimensional space mapped by the clustering 118 instructions. Accordingly, items more representative of the group or cluster as a whole are given more weight by the NLG 112 by virtue of the architecture of the NLG 112. For example, in some embodiments, items positioned later in the conditioning input are more heavily weighted when choosing output tokens that items positioned earlier in the conditioning input. Accordingly, items closer to the centroid or prototype of the cluster may be positioned at the end of the conditioning input.

In some implementations, the instructions for input generation 120 may provide other portions of the conditioning input, such as seeds used by the NLG 112 to generate knowledge assessment items. Further, the instructions for input generation 120 may format conditioning input based on specifications and/or interfaces of the NLG 112. For example, where the interface of the NLG 112 expects the conditioning input to be terminated by a particular token (e.g., a null or specific terminating character), the instructions for input generation 120 may add the particular token to the conditioning input before providing the conditioning input to the NLG 112.

In various embodiments, the memory 111 may include instructions for implementing item verification 122 when executed by the processor 109. The instructions for item verification 122 may include instructions for performing checks of items generated by the NLG 112. For example, item verification 122 may review text of a generated item to ensure that the item does not include undesirable elements, such as repeated answer choices, nonsensical phrases, repeated words, and the like. Item verification 122 may discard items that include such undesirable elements and may, in some embodiments, flag undesirable elements and redirect them, providing the conditioning input to the NLG 112 a second time to generate a new item. In some embodiments, item verification 122 may also analyze additional aspects of generated items to compare to user specifications. For example, item verification 122 may analyze lexical complexity, word count, question stem length, reading level, or other specifications to ensure that generated items match the user specifications before providing the item to a user device or storing the item with other generated items. User specifications may include, for example type-token ratio, Flesch Reading Ease, Coleman-Liau Index, and the like. Performing item verification 122 concerning target user specifications may be especially important, for example, when generated items are intended for a particular grade level, reading ability, or other metric which may be underrepresented in text corpuses used to train NLGs 112.

Item verification 122 may further do a duplication or similarity check to ensure that the generated item is not either a duplicate of a model item or similar enough to a model item that it may be less useful to, for example, an entity providing test preparation looking for a variety of testing items. In some examples, a duplication or similarity check may compare the tokens of the generated item to tokens of the model items and may discard a generated item when more than a threshold number of sequential tokens in the generated item match a sequence of items in a model item. A duplication or similarity check may also be performed over archive items (e.g., publicly available items or items previously generated for a user using the NLG interface 110) to ensure that the generated item represents new content. Accordingly, a user can continually request new items in a content area and without being provided with the same or very similar items, as duplicate items could be difficult to manage when, for example, providing randomized sets of items for assessments as an individual assessment could include the same item more than once.

Though not depicted in FIG. 2, the NLG interface 110 may include or interact with additional software or hardware components for various functions. For example, an authorization service may be utilized to connect user devices to the NLG interface 110. Users may sign into the NLG interface 110 and may be directed to an authorization service. Upon authorization, the user may access data and use the user interface 126 to interact with the NLG interface 110. In another example, the NLG interface 110 may be accessible by means other than the user interface 126. For example, various users may connect to the NLG interface 110 through, for example, command line instructions, and may provide commands to the NLG interface 110 through scripts, text commands, or means other than a user interface 126. Additional services and/or applications may be utilized by the NLG interface 110 to perform functions such as querying databases, communicating between components, managing compute resources delegated to the NLG interface 110, and other functions.

Figure 5:
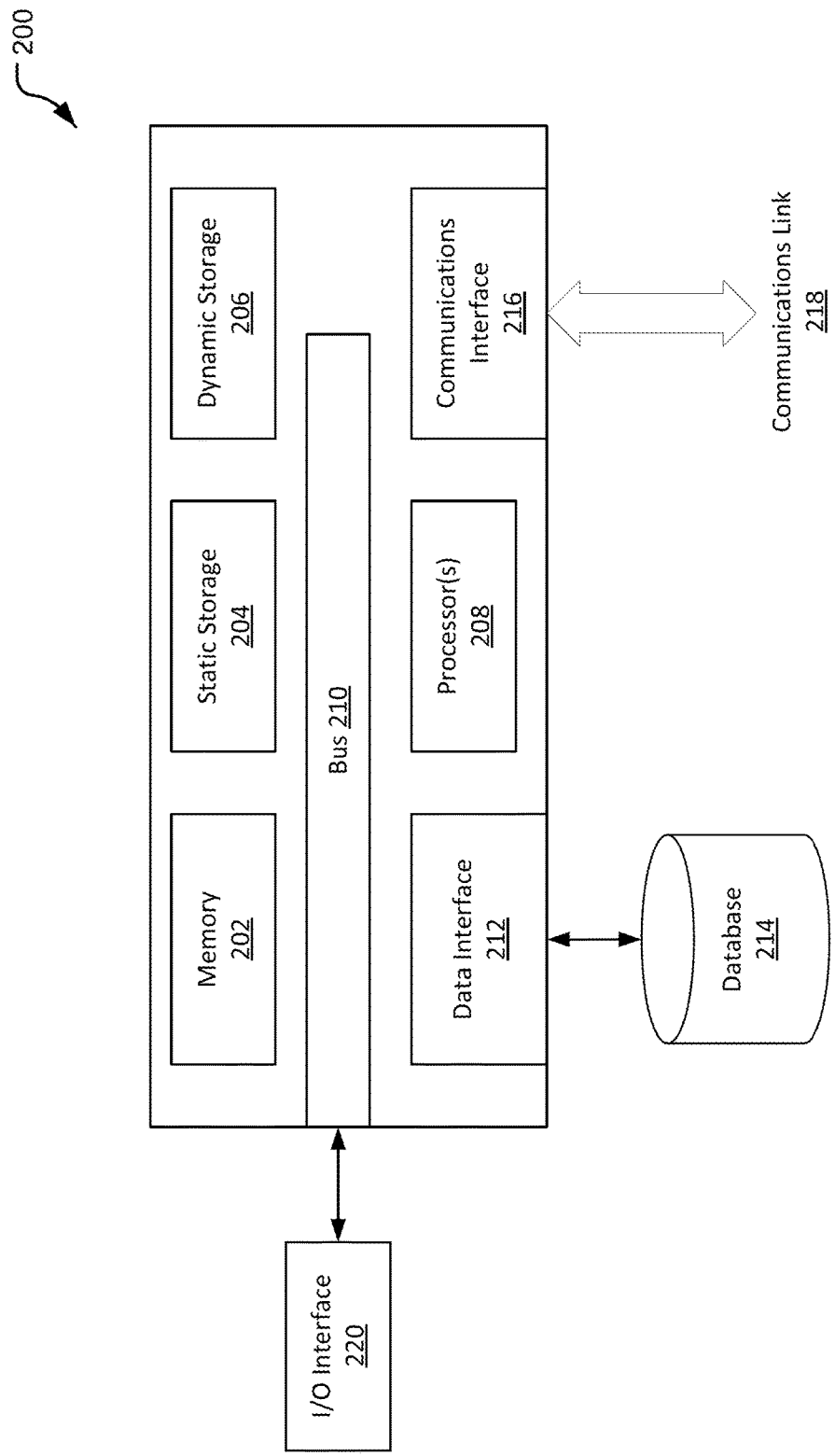
FIG. 5 is a schematic diagram of an example computer system which may be used to implement various embodiments in the examples described herein.

The NLG interface 110 may be implemented using various computing systems. Turning to FIG. 5, an example computing system 200 may be used for implementing various embodiments in the examples described herein. For example, processor 109 and memory 111 may be located at one or several computing systems 200. In various embodiments, user device 106 is also implemented by a computing system 200. This disclosure contemplates any suitable number of computing systems 200. For example, a computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for the text encoder 116, clustering 118, input generation 120, and item verification 122 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 504 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, user data 102 and/or interface data 104 may each be stored using a database 214.

Dataflow, Clustering, and Conditioning Input Generation.

FIG. 3 illustrates a diagram of example dataflow between example components of the NLG interface 110 in accordance with some embodiments of the disclosure. As shown in FIG. 2, model assessment items 114 may be provided to a text encoder 116, which may generate feature vectors 128 corresponding to the model items. Clustering 118 may map the feature vectors 128 in a multidimensional space to identify clusters or subgroups 132, 134, 136, 138, 140, and 142 of model knowledge assessment items. The clusters, as well as centroids or representative central vectors for each cluster may be provided to input generation 120. Input generation 120 generates conditioning inputs to the NLG for the clusters of model items.

Though shown as a mapping in FIG. 3, clustering 118 may obtain similar information in other ways, such as by analyzing the feature vectors 128 and calculating distances between various feature vectors 128. Though clustering 118 is shown identifying 6 clusters or groupings of items, more or fewer groupings may be used depending on the application and characteristics of the model items 114. For example, sets of model items 114 covering smaller subject or content areas (e.g., tests covering chapters or portions of courses) may use fewer item groupings and sets of model items 114 covering many discrete concepts may use more item groupings. In some implementations, the user may change the number of sub-groups through the user interface 126. Alternatively or additionally, clustering 118 or other components of the NLG interface 110 may determine the number of sub-groups based on, for example, a content map provided with the set of model items 114.

In various embodiments, centroids or prototypes may be formatted as numerical representations (e.g., feature vectors) but may not encode an actual representative knowledge assessment item. Rather, the centroids may provide a theoretical center point of the cluster from which to calculate distance for ordering inputs by the input generation 120. In some embodiments, the centroids may be calculated after mapping the model items to the multidimensional space, such as through a k-means clustering algorithm. Centroids may also be estimated based on, for example, a content map of the model items. The numeric encodings of model items 114, numeric representations of centroids, and cluster information may be provided to input generation 120 for generation of conditioning input to the NLG 112.

Figure 4A:
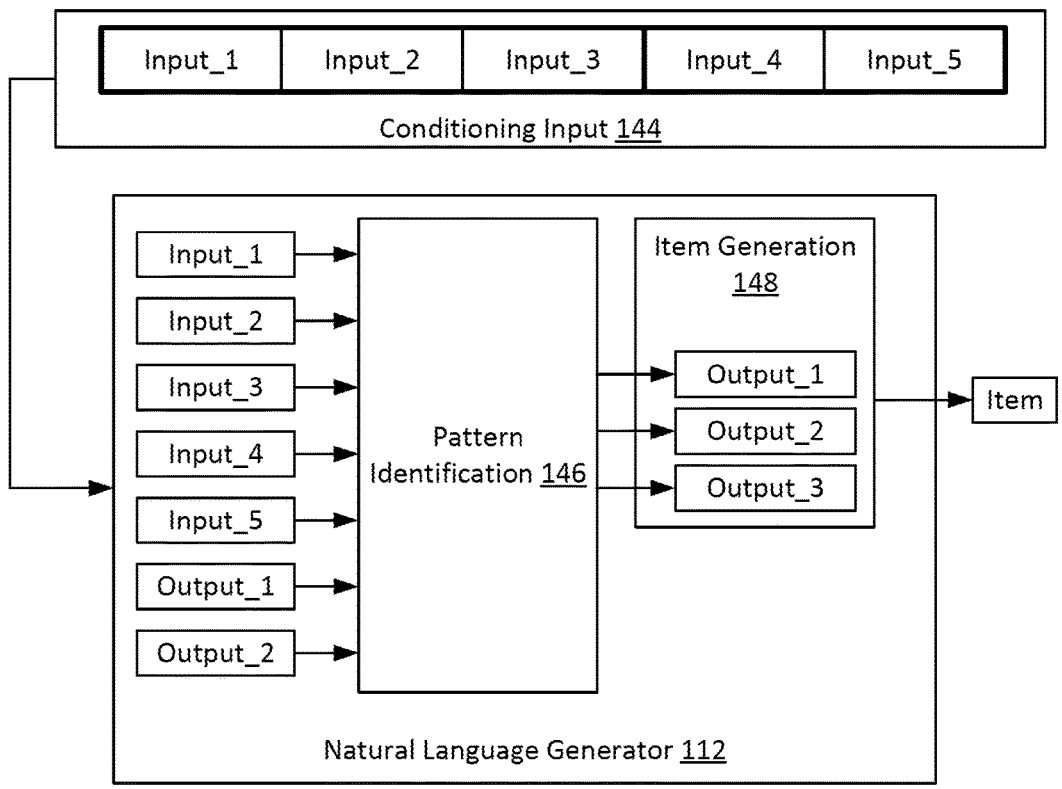
FIG. 4A illustrates example processing of a conditioning input by a NLG, in accordance with some embodiments of the disclosure.
Figure 4B:
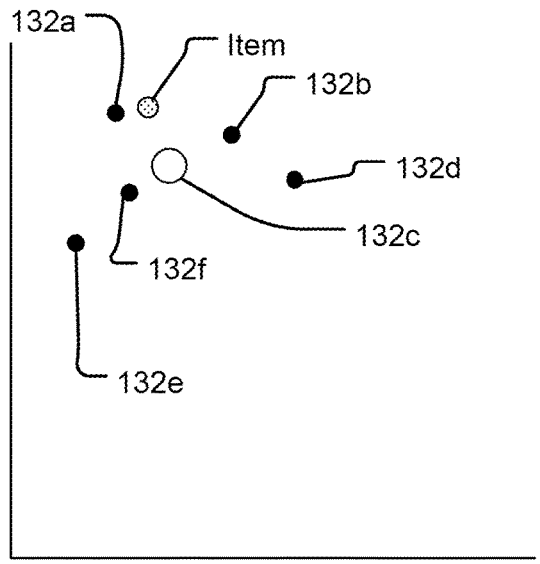
FIG. 4B illustrates an example item generated by a NLG provided with a first conditioning input in accordance with some embodiments of the disclosure.
Figure 4C:
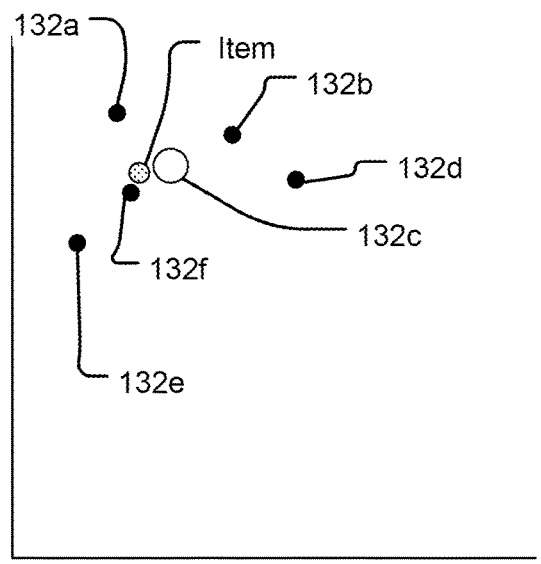
FIG. 4C illustrates an example item generated by a NLG provided with a second conditioning input in accordance with some embodiments of the disclosure.

FIG. 4A illustrates example processing of a conditioning input by a NLG 112, in accordance with some embodiments of the disclosure. The NLG interface 110 may generate conditioning input 144 to the NLG 112. As described above, input generation 120 may generate the conditioning input using numeric representations of model items, and cluster or group information including centroids or prototype items and membership of model items in a specific cluster. FIGS. 4A-4C focus on item generation for a cluster 132 including model items 132a, 132b, 132d, 132e, and 132f and a centroid 132c.

Generally, the conditioning input 144 is composed of individual input tokens (shown as Input_1, Input_2, Input_3, Input_4, and Input_5 in FIG. 4A) which are individually considered by the NLG 112. Input tokens may be words, special characters (spaces, newline, end character, etc.), numerals, or other elements individually considered by the NLG 112. The conditioning input 144 is generally created by concatenating input tokens making up each of the model items in the cluster or group corresponding to the conditioning input. For example, in FIG. 4A, Input_1, Input_2, and Input_3 may form a first model item while Input_4 and Input_5 form a second model item. As described above, the ordering of the model items may be based on numeric representations of model items in the group or cluster. In practice, model items may be formed from more tokens, and the number of tokens in a model item or in the conditioning input 144 as a whole may be limited by the NLG 112.

As shown in FIG. 4A, the NLG 112 may generally include logic and components for pattern identification 146 and item generation 148. At a high level, pattern identification 146 receives the inputs making up the conditioning input 144 sequentially. For each input, pattern identification 146 generates at least one contextual embedding for the input (e.g., a contextual embedding vector), which represents the original token, including the token's position within the input. Pattern identification 146 may retain or store contextual embeddings for previously processed inputs in the conditioning input 144 and may determine a contextual embedding for an input token using the stored contextual embeddings for previously processed inputs. For example, in some embodiments, pattern identification 146 may determine contextual embeddings for each token in a conditioning input as a linear combination of other tokens in the conditioning input. Accordingly, contextual embeddings for later-occurring tokens may be based on a richer set of data. The contextual embedding for the last occurring input (e.g., Input_5 in FIG. 4A) may be used to produce a probability distribution for the next token over all possible tokens, giving a higher probability to tokens most likely to follow Input_5 based on the conditioning input 144.

Item generation 148 may generally sample from the probability distribution produced by pattern identification 146 to produce a next token (e.g., Output_1, Output_2, and Output_3 in FIG. 4A). An item is generally composed of each of the output tokens chosen by item generation 148 and may be terminated, in some examples, when the output obtained from the probability distribution is an end or termination token. As shown in FIG. 4A, rather than continually sampling from the first probability distribution generated by pattern identification 146, the output tokens generated by item generation 148 may be provided to pattern identification 146. Pattern identification 146 may then process the output token by creating a contextual embedding of the token in view of the stored contextual embeddings for the input tokens to generate a probability distribution for the next output token. Item generation 148 may then sample from this updated probability distribution to generate the next output token. Item generation 148 may generate the Item from the outputs once a terminating output token is produced. This item may be referred to herein as a raw item or generated item, indicating that the item is composed of output from the NLG 112 before additional editing, content checks, and the like.

Pattern identification 146 and item generation 148 may be implemented by any architecture processing tokens in the above described manner to complete next token prediction language generation. In some particular embodiments, the NLG 112 may be implemented by a transformer language generation model. In a transformer language generation model, pattern identification 146 may be implemented by any number of successive transformer blocks, where each transformer block processes the input tokens sequentially, producing and storing contextual embeddings for each processed token. Transformer blocks may produce a contextual embedding for a new token by comparing the new token to stored contextual embeddings for each already-processed token using multi-head attention. The transformer block may store the contextual embedding for the new token and pass the contextual embedding for the new token to the next transformer block in sequence within pattern identification 146. The next transformer block may then use the received contextual embedding and stored contextual embeddings to produce an additional contextual embedding for the new element. The transformer blocks continue in sequence, storing and producing contextual embeddings for a new input token. As each transformer block builds upon the contextual embedding produced by the previous transformer block, each successive transformer block is able to produce a contextual embedding capturing an increasingly rich and sophisticated representation of the original input element.

In various embodiments, transformer blocks may be implemented using decoders including feedforward neural networks, each with weights determined by the multi-head attention calculated by the transformer block during token processing. Other types of transformer architecture may also be used to implement the NLG 112, such an encoder-only or encoder/decoder architecture.

Due to the sequential processing of tokens by the NLG 112 described above, inputs appearing later in the conditioning input may be considered more heavily when generating the probability distribution, such that the ordering of model items within the conditioning input 144 affects the output tokens generated by the NLG 112. Accordingly, an item generated by the NLG 112 may more closely resemble items provided later in the conditioning input 144. Where items provided later in the conditioning input 144 are not representative of the cluster of model items as a whole, generated items may likewise be less representative of the cluster of model items as a whole, and may less successfully capture concepts represented by the cluster.

FIG. 4B shows a theoretical item mapped relative to items $132a$, $132b$, $132d$, $132e$, and $132f$ and centroid $132c$ of the cluster 132. The mapping shown in FIG. 4B may be, for example, a mapping of a numeric representation of the item relative to the numeric representations of the items of the cluster shown, for example, in FIG. 3. The conditional input provided to the NLG 112 to generate the item of FIG. 4B is generated by ordering the items in the cluster 132 arbitrarily, with the tokens making up item $132a$ appearing last in the conditioning input 144. As shown in FIG. 4B, the generated item may then be similar to item $132a$. In contrast, FIG. 4C shows another theoretical item mapped relative to the items and centroid of the cluster 132. To produce the item in FIG. 4C, the items of the cluster 132 are ordered based on a distance between the numeric representation of the item and the centroid $132c$ of the cluster. Using this method, items closer to the centroid $132c$ (and thus more representative of the cluster 132 overall) may be ordered last in the conditioning input 144 so that the generated item is more likely to be representative of the cluster 132 as a whole. For example, the conditioning input 144 may be generated such that the tokens making up item $132f$ appear last in the conditional input 144. As shown, the generated item is then more similar to item $132f$ than other items in the cluster 132, and is closer to the centroid $132c$. In various embodiments, each of the items may be ordered within the conditioning input 144 in this way, such that the item furthest from the centroid $132c$ is considered first, with the remaining items in the cluster 132 appearing in the conditioning input 144 in descending order of distance to the centroid $132c$.

While FIGS. 4A, 4B, and 4C are described with respect to a decoder transformer based natural language model where the last input in a conditioning input is given a higher weight, other transformer based natural language models may be used, and the inputs ordered differently, without departing from the scope of this disclosure. For example, the NLG 112 may be implemented using an architecture where the first item in the conditioning input 144 is given a higher weight and the items may be ordered such that the item closest to the centroid (e.g., most representative of the cluster) is considered first to generate an item representative of the cluster.

Methods for Generating Assessment Items Using an NLG Interface

Figure 6:
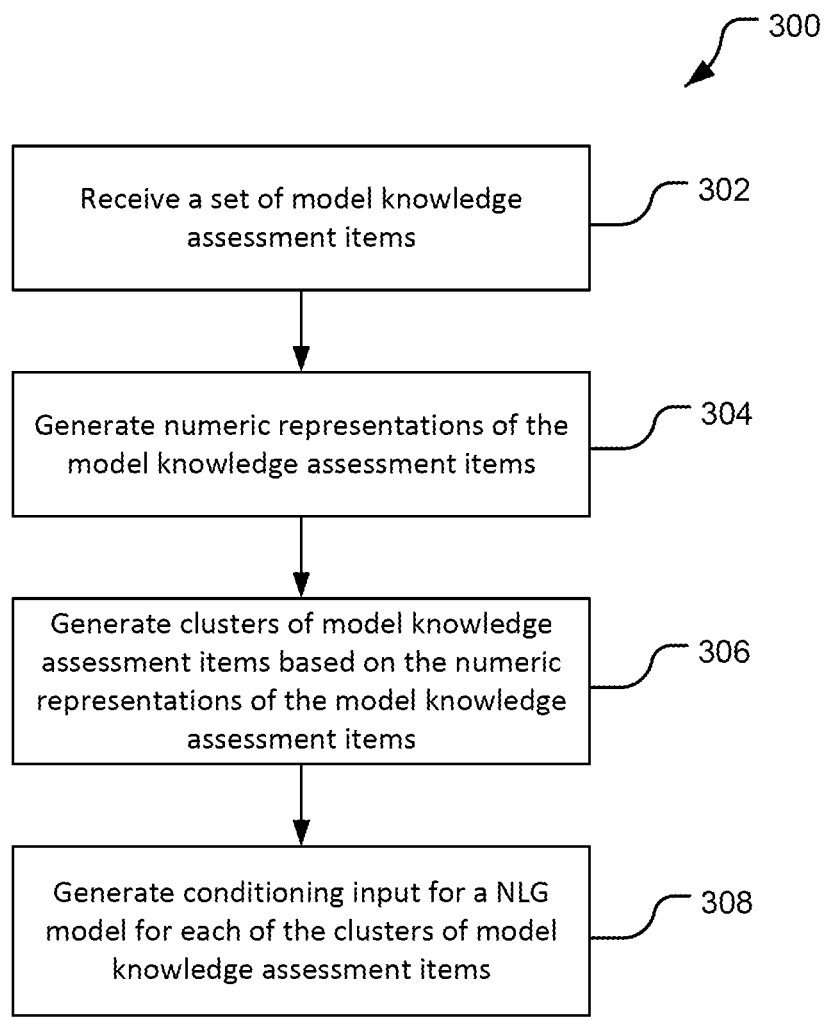
FIG. 6 illustrates an example process for generating conditioning input for a NLG, in accordance with various embodiments of the disclosure.

FIG. 6 illustrates an example process 300 for generating conditioning input for a NLG, in accordance with various embodiments of the disclosure. The process 300 may be executed by various components of the NLG interface 110. At block 302, the NLG interface 110 receives a set of model knowledge assessment items. The NLG interface 110 may receive the set of model knowledge assessment items directly via a user request (e.g., the user may upload or otherwise provide the model items with a request to the NLG interface 110). In some embodiments, the NLG interface 110 may retrieve model knowledge assessment items from a remote location based on information provided with the user request. For example, a user request may include a request to generate items for practice of a standardized test, without providing model items. The NLG interface 110 may retrieve model items from a public repository of published practice items for the standardized test responsive to the user request. The knowledge assessment items may be provided in various formats including plain text, xml, json, csv, or other formats. Accordingly, the NLG interface 110 may include instructions for parsing the model knowledge assessment items from various formats. In an exemplary embodiment, the model knowledge assessment items are provided to the text encoder 116 once the items are received by the NLG interface 110.

At block 304, the NLG interface 110 generates numeric representations of the model knowledge assessment items. Upon receiving the model knowledge assessment items, the text encoder 116 may generate numeric representations of the model knowledge assessment items, such as feature vectors. In some implementations, the text items may be provided to an encoder (e.g., a USE or BERT encoder)

which may generate feature vectors encoding the model items, including lexical features, syntactic features, formatting, and other features. In other implementations, the text encoder 116 within the NLG interface 110 may perform the initial encoding function. The text encoder 116 may augment the generated feature vectors to include, for example, specifications for knowledge assessment items, metadata relating to the items (e.g., difficulty scores, categorizations, item type, etc.), concepts covered by the items within a content domain and other information.

At block 306, the NLG interface 110 generates clusters of model knowledge assessment items based on the numeric representations of the model knowledge assessment items. A clustering component 118 of the NLG interface 110 may group the model knowledge assessment items using the numeric representations of the model knowledge assessment items using, in various examples, clustering algorithms predicated on a set number of clusters, classifiers trained using similar items and metadata pairings, and other methods. In some implementations, clustering 118 may dynamically determine a number of clusters using the specific data. Accordingly, clustering 118 may be accomplished using various methods without departing from the scope of the present disclosure. Along with generating the clusters of model knowledge assessment items, clustering 118 may calculate centroids or theoretical centers for each cluster of model knowledge assessment items for use in generating conditioning input for each of the clusters of model knowledge assessment items.

At block 308, the NLG interface 110 generates conditioning input for a NLG model for each of the clusters of model knowledge assessment items. In various embodiments, input generation 120 may generate conditioning inputs for each of the clusters of model knowledge assessment items by ordering items based on a distance of the numeric representation of the items to the centroid of the cluster, as described above. Input generation 120 may also format conditioning input based on interfaces used by the NLG 112 and transmit the conditioning input to the NLG 112 for item generation. In some embodiments, the conditioning input generated by input generation 120 may be saved for later use as for example, user data 102 and/or interface 104 such that the conditioning input may be revised or re-used to generate additional items for the same set of model knowledge assessment items.

Figure 7:
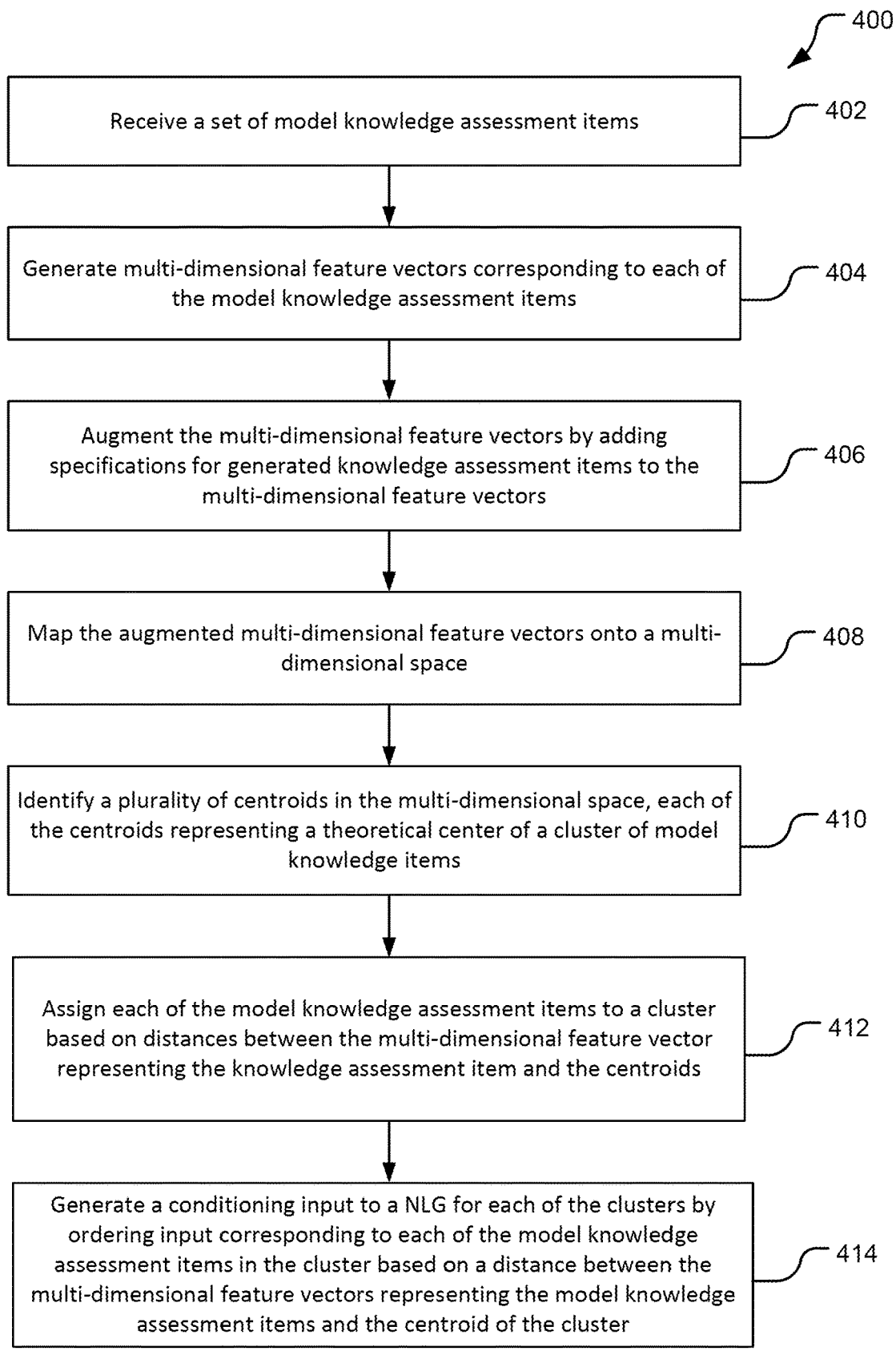
FIG. 7 illustrates an example process for generating conditioning input for a NLG, in accordance with various embodiments of the disclosure.

FIG. 7 illustrates an example process 400 for generating conditioning input for a NLG, in accordance with various embodiments of the disclosure. The process 400 may be a specific implementation of the process 300. Like the process 300, the process 400 may be performed by various components of the NLG interface 110. At block 402, the NLG interface 110 receives a set of model knowledge assessment items. At block 404, the NLG interface 110 generates multi-dimensional feature vectors corresponding to each of the model knowledge assessment items. Blocks 402 and 404 may be implemented using processes and elements of the NLG interface 110 discussed with respect to blocks 302 and 304 of process 300. At block 406, the NLG interface 110 augments the multi-dimensional feature vectors by adding specifications for generated knowledge assessment items to the multi-dimensional feature vectors. For example, added specifications may include desired length of the items, lexical indicators of the generated items, and the like. Further, block 406 may add calculations of the specifications for the model items to the multi-dimensional feature vectors. For example, where a desired word count for generated items is provided as a user specification, the text encoder 116 may count words in each of the model items and update the multi-dimensional feature vectors with the word counts.

At block 408, the NLG interface 110 maps the augmented multi-dimensional feature vectors onto a multi-dimensional space. For example, the implementation of clustering 118 shown in FIG. 3 depicts a mapping of multi-dimensional feature vectors in a multi-dimensional space. In various embodiments, the multi-dimensional space may include any number of dimensions depending on features included in the augmented multi-dimensional feature vectors. At block 410, the NLG interface 110 identifies a plurality of centroids in the multi-dimensional space, where each of the centroids represent a theoretical center of a cluster of model knowledge items. In various embodiments, clustering 118 may identify centroids prior to forming clusters of items based on the distribution of feature vectors in the multi-dimensional space. The number of centroids identified may be predefined by a user or a default setting or may be determined by the NLG interface 110 based on characteristics of the set of model knowledge assessment items such as breadth of concept coverage, discrete or interconnectedness of concepts covered by the set of model knowledge assessment items, the number of model knowledge assessment items provided in the set, and other similar factors.

At block 412, the NLG interface 110 assigns each of the model knowledge assessment items to a cluster based on distances between the multi-dimensional feature vector representing the knowledge assessment item and the centroids. At block 414, the NLG interface 110 generates a conditioning input to a NLG 112 for each of the clusters by ordering input corresponding to each of the model knowledge assessment items in the cluster based on a distance between the multi-dimensional feature vectors representing the model knowledge assessment items and the centroid of the cluster.

Figure 8:
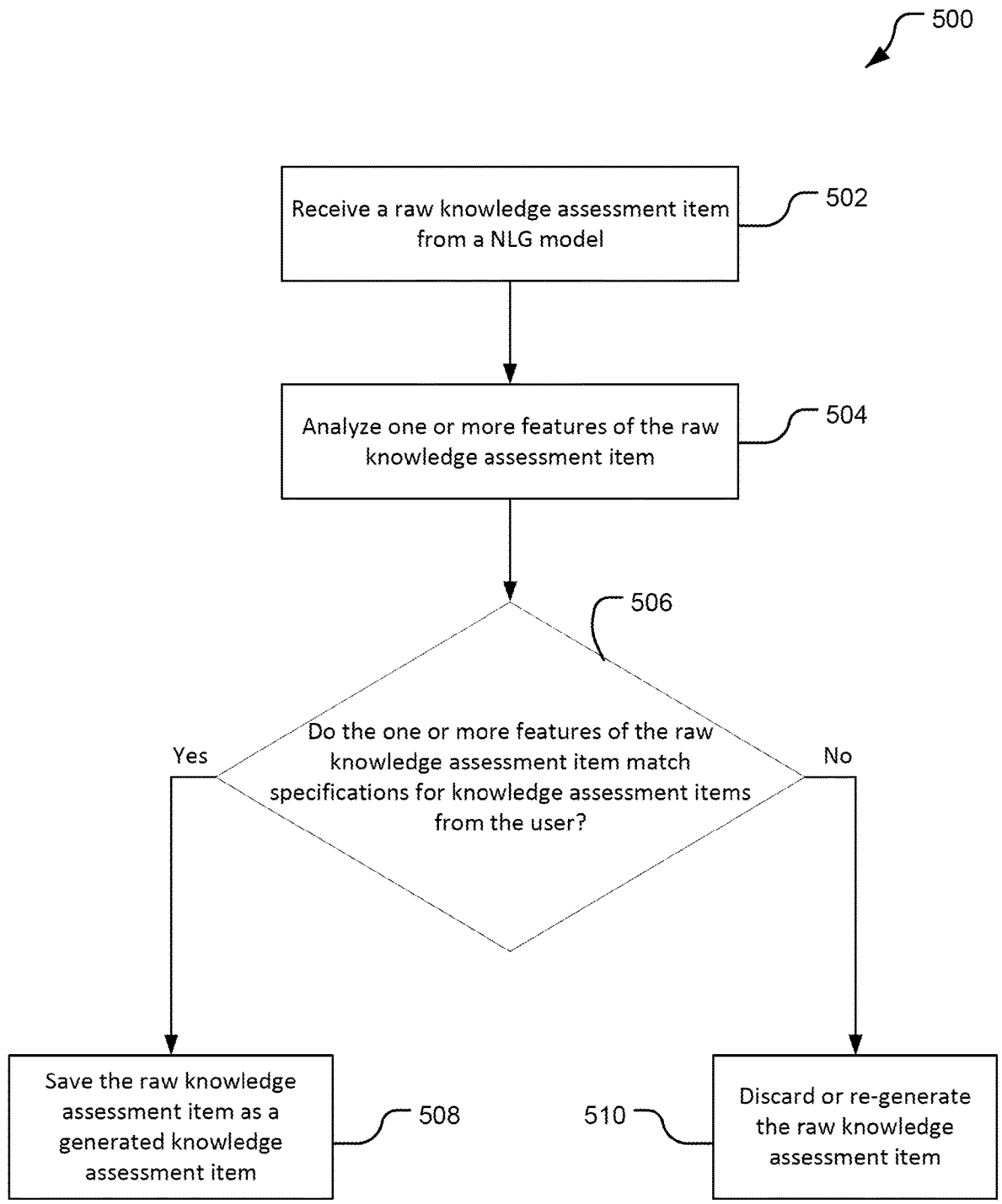
FIG. 8 illustrates an example process for performing items verification of items generated by a NLG, in accordance with various embodiments of the disclosure.

FIG. 8 illustrates an example process 500 for performing item verification of items generated by a NLG 112, in accordance with various embodiments of the disclosure. The process 500 may be performed by various components of the NLG interface 110. At block 502, the NLG interface 110 receives a raw knowledge assessment item from a NLG model 112. A raw knowledge assessment item may be an item obtained directly from the NLG model 112 without further editing or analysis by the NLG interface 110. The raw knowledge assessment item may include, in various embodiments, a question stem, answer choices, diagrams, and/or passages or other material provided in conjunction with the item. The raw knowledge assessment item may be provided in text format including formatting. Raw knowledge assessment items may be provided to item verification 122 components of the NLG interface 110 in various implementations.

At block 504, the NLG interface 110 analyzes one or more features of the raw knowledge assessment item. For example, item verification 122 may perform high level checks, such as scanning the raw item for repeated words, repeated answer choices, or other easily identifiable issues. Item verification 122 may also calculate or determine other features such as word count, number of answer choices, etc. Further, in some embodiments, item verification 122 may be further configured to check more complex features such as content coverage, coherency, reading ease, etc.

At block 506, the NLG interface 110 determines whether the one or more features of the raw knowledge assessment item match specifications for knowledge assessment items provided by a user. The specifications may, in various implementations, be provided by the user through the user interface 126. In other implementations, specifications may be standardized across test authoring entities and may be retrieved from other locations, such as user data 102.

Where the one or more features of the raw knowledge assessment item do match the specifications for knowledge assessment items, the NLG interface 110 executes block 508 and saves the raw knowledge assessment item as a generated knowledge assessment item. Where the one or more features of the raw knowledge assessment item do not match the specifications for knowledge assessment items, the NLG interface 110 executes block 510 and discards or re-generates the raw knowledge assessment item. Where item verification 122 can easily identify and correct unmet specifications (e.g., repeated answer choices or repeated words), the item may be re-generated by providing an edited version of the item to input generation 120, which may edit the conditioning input used to generate the item to include the edits to the item. The updated conditioning input may then be provided to the NLG 112 to regenerate the item.

Figure 9:
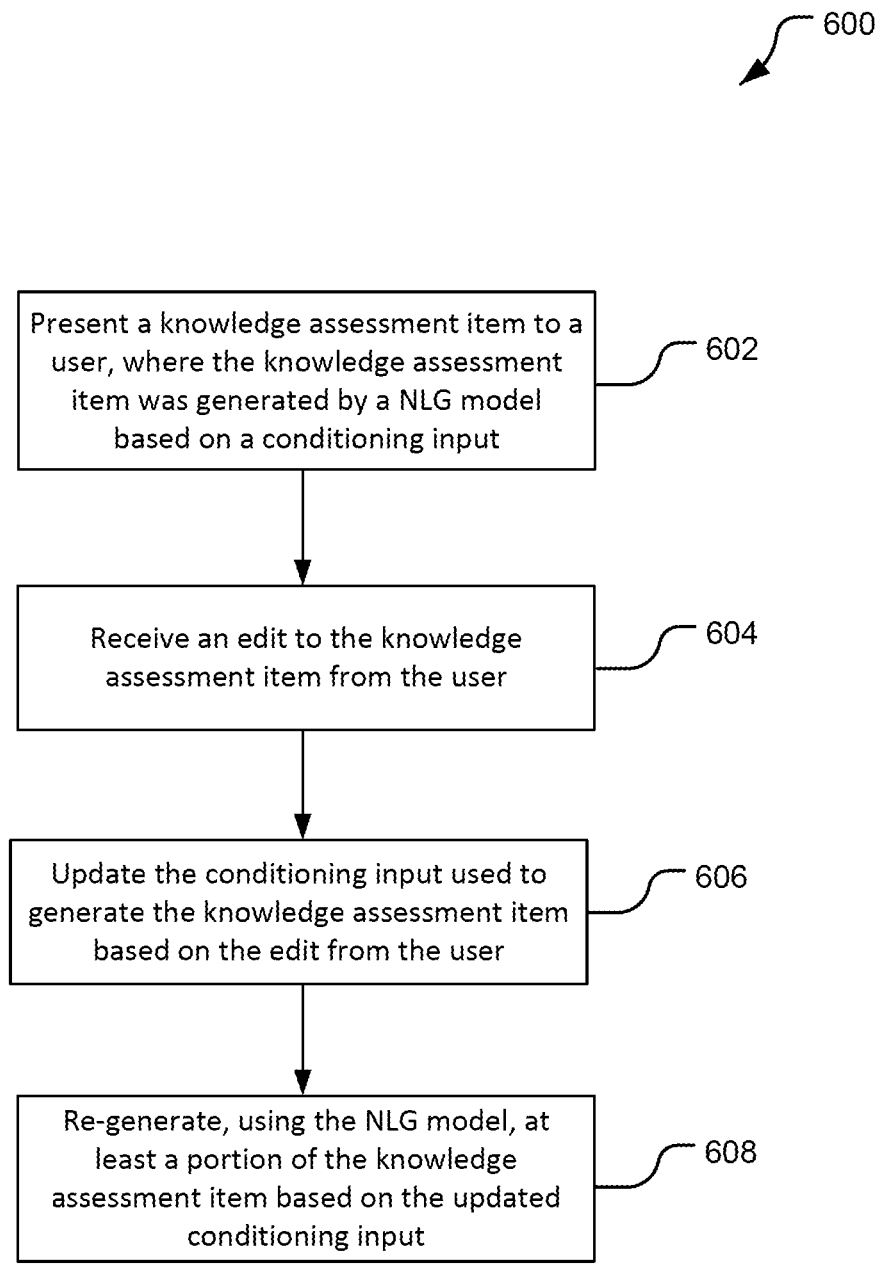
FIG. 9 illustrates an example process for regenerating items generated by a NLG based on input received through an editing interface, in accordance with various embodiments of the disclosure.

FIG. 9 illustrates an example process 600 for regenerating items generated by a NLG based on input received through a user interface, in accordance with various embodiments of the disclosure. The process 600 may be performed by various components of the NLG interface 110 in communication with the user interface 126 at the user device 106. At block 602, the NLG interface 110 presents a knowledge assessment item to a user after the knowledge assessment item is generated by a NLG model based on a conditioning input. The knowledge assessment item may be presented to the user after initial checks by item verification 122 via a user interface 126 to the NLG interface 110. The knowledge assessment item may be presented to the user broken up into the question stem and answer choices. In some implementations, the user interface 126 may provide features allowing a user to select a key (correct answer) and distractors from among the generated answer choices.

At block 604, the NLG interface 110 receives an edit to the knowledge assessment item from the user. The edit may be made via the user interface 126 an may include, in various embodiments, deleting or adding text to the question stem, deleting or adding text to answer choices, deletion and regeneration of one or more answer choices, deletion and regeneration of the question stem, and the like. The edit may be received by input generation 120 components of the NLG interface 110 for regeneration of the item based on the edit or edits.

At block 606, the NLG interface 110 updates the conditioning input used to generate the knowledge assessment item based on the edit from the user. In various embodiments, input generation 120 may update the conditioning input by providing the editing text to the NLG 112 as a seed for generating the remainder of the item while the remainder of the conditioning input may be the same input used initially to generate the item. In other embodiments, the conditioning input may be further modified, such as my reordering inputs based on the edits received from the user interface 126. For example, if an edit deletes a portion of a question stem similar to wording of an input previously provided as the first input of the conditioning input, the input may be moved such that it is considered by the NLG 112 after other inputs more relevant to the edited item.

At block 608, the NLG interface 110 generates, using the NLG 112 model, at least a portion of the knowledge assessment item based on the updated conditioning input. The portion of the item generated may be generated by providing the updated conditioning input to the NLG 112. In various embodiments, the re-generated item may be analyzed by item verification 122 of the NLG interface 110 before being returned to the user. In other embodiments, the regenerated item may be returned directly to the user interface 126. Further, in various embodiments, the NLG interface 110 may track or otherwise record edits made to generated items (e.g., with interface data 104) in order to refine methods used by the NLG interface 110. For example, where items generated using a particular conditioning input are frequently edited by users in a similar manner suggesting an item of the conditioning input is adversely affecting generated items, input generation 120 may update the conditioning input to reduce influence of the item (e.g., by reordering the inputs of the conditioning input such that the input corresponding to the item is considered after other items by the NLG 112). Accordingly, user interaction with the NLG interface 110 may provide additional feedback for generating large volumes of knowledge assessment items using a NLG 112.

Using the methods and techniques described above, the NLG interface 110 may direct various NLG 112 models to provide large volumes of usable knowledge assessment items. The NLG interface 110 may work with the architecture of the NLG 112 and the process of few-shot learning to create large volumes of knowledge assessment items covering various subject areas and may provide technically accurate items. The NLG interface 110 may include additional features for dynamic editing and regeneration of knowledge assessment items and may learn and refine inputs over time to converge on conditioning inputs which generate higher quality items. Accordingly, the NLG interface 110 works in conjunction with the NLG 112 to improve the functioning of the NLG 112 for generation of knowledge assessment items.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of generating knowledge assessment items directed to a subject area, the method comprising:
   receiving, from a user interface, a set of model knowledge assessment items collectively directed to the subject area;
   grouping the set of model knowledge assessment items into a plurality of similar item groups using numeric features corresponding to the model knowledge assessment items, wherein the plurality of similar item groups include selected items of the set of model knowledge assessment items that are semantically similar to other model knowledge assessment items in the respective similar item groups;
   generating a conditioning input for each of the plurality of similar item groups to by ordering the model knowledge assessment items based on a distance between said model knowledge assessment items and a centroid in each of the plurality of similar item groups;
   receiving, from a transformer-based natural language generation (NLG) model, raw assessment items, wherein each of the raw assessment items is generated responsive to providing the conditioning input for one of the plurality of similar item groups to the transformer-based NLG model, and wherein each of the raw assessment items is generated based on a contextual embedding vector for each token in the conditioning input;
   receiving, from the user interface, specifications for the knowledge assessment items;
   in response to receiving the specifications, identifying the knowledge assessment items from the raw assessment items, wherein identifying the knowledge assessment items from the raw assessment items comprises comparing features of the raw assessment items to the specifications for the knowledge assessment items; and
   providing the knowledge assessment items to the user interface, wherein the knowledge assessment items are collectively directed to the subject area.

2. The method of claim 1, wherein the numeric features corresponding to the model knowledge assessment items comprise multi-dimensional feature vectors encoding semantics, structure, and concepts of the model knowledge assessment items.

3. The method of claim 2, wherein grouping the set of model knowledge assessment items into the plurality of similar item groups comprises clustering the multi-dimensional feature vectors corresponding to the model knowledge assessment items.

4. The method of claim 1, wherein the conditioning input for a similar item group of the plurality of similar item groups comprises inputs corresponding to each of the model knowledge assessment items in the respective similar item group.

5. The method of claim 4, wherein generating the conditioning input for the similar item group comprises ordering the inputs corresponding to each of the model knowledge assessment items based on group numeric features representing the respective similar item group as a whole.

6. A system for generating knowledge assessment items directed to a subject area based on a set of model knowledge assessment items collectively directed to the subject area, the system comprising:
   an item generation interface in communication with a user interface, the item generation interface configured to:
   group the set of model knowledge assessment items into a plurality of similar item groups using numeric features corresponding to the model knowledge assessment items, wherein the plurality of similar item groups include selected items of the set of model knowledge assessment items covering conceptually similar concepts within the subject area,
   generate a conditioning input for each of the plurality of similar item groups by ordering the model knowledge assessment items based on a distance between said model knowledge assessment items and a centroid in each of the plurality of similar item groups,
   receive, from a transformer-based natural language generation (NLG) model, raw assessment items, wherein each of the raw assessment items is generated responsive to providing the conditioning input for one of the plurality of similar item groups to the transformer-based NLG model, and wherein each of the raw assessment items is generated based on a contextual embedding vector for each token in the conditioning input,
   receive specifications for the knowledge assessment items, and
   in response to receiving the specifications, identify the knowledge assessment items from the raw assessment items, wherein identifying the knowledge assessment items from the raw assessment items comprises comparing features of the raw assessment items to the specifications for the knowledge assessment items; and
   the user interface in communication with the item generation interface, wherein the user interface is configured to:
   receive the set of model knowledge assessment items collectively directed to the subject area;
   display the knowledge assessment items to a user, wherein the knowledge assessment items are collectively directed to the subject area.

7. The system of claim 6, wherein the numeric features corresponding to the model knowledge assessment items comprise multi-dimensional feature vectors encoding semantics, structure, and concepts of the model knowledge assessment items.

8. The system of claim 7, wherein grouping the set of model knowledge assessment items into the plurality of similar item groups comprises clustering the multi-dimensional feature vectors corresponding to the model knowledge assessment items.

9. The system of claim 6, wherein the conditioning input for a similar item group of the plurality of similar item groups comprises inputs corresponding to each of the model knowledge assessment items in the similar item group.

10. The system of claim 9, wherein generating the conditioning input for the similar item group comprises ordering the inputs corresponding to each of the model knowledge assessment items based on group numeric features representing the respective similar item group as a whole.

11. A method of generating knowledge assessment items, the method comprising:
    receiving, via a user interface, a set of model knowledge assessment items collectively directed to a subject area;

grouping the set of model knowledge assessment items into a plurality of similar item groups using numeric features corresponding to the model knowledge assessment items, wherein the plurality of similar item groups include selected items of the set of model knowledge assessment items that are semantically similar to other model knowledge assessment items in the respective similar item groups;

generating a conditioning input for each of the plurality of similar item groups by ordering the model knowledge assessment items based on a distance between said model knowledge assessment items and a centroid in each of the plurality of similar item groups;

receiving, from a transformer-based natural language generation (NLG) model, raw assessment items, wherein each of the raw assessment items is generated responsive to providing the conditioning input for one of the plurality of similar item groups to the transformer-based NLG model, and wherein each of the raw assessment items is generated based on a contextual embedding vector for each token in the conditioning input;

receiving, via the user interface, specifications for the knowledge assessment items;

in response to receiving the specifications, identifying the knowledge assessment items from the raw assessment item, wherein identifying the knowledge assessment items from the raw assessment items comprises comparing features of the raw assessment items to the specifications for the knowledge assessment items;

presenting, via the user interface, the knowledge assessment item, wherein the knowledge assessment item is directed to the subject area;

receiving, via the user interface, an edit to text of the knowledge assessment item;

updating the conditioning input used to generate the knowledge assessment item with the edited text; and re-generating, using the transformer-based NLG model, at least a portion of the knowledge assessment item based on the updated conditioning input.

12. The method of claim 11, wherein the NLG model comprises a decoder transformer-based language model.

13. The method of claim 11, wherein the numeric features comprise multi-dimensional feature vectors encoding semantics, structure, and concepts of the model knowledge assessment items.

14. The method of claim 13, further comprising clustering the multi-dimensional feature vectors corresponding to the model knowledge assessment items.

15. The method of claim 11, wherein the conditioning input for the similar item groups comprises inputs corresponding to the model knowledge assessment items in the respective similar item groups.

16. The method of claim 15, further comprising ordering the inputs corresponding to the model knowledge assessment items based on group numeric features representing the respective similar item groups.

17. A non-transitory data storage medium having program code stored thereon, wherein the program code is executable on a computer system with one or more computer processors and memory, in order to perform the method of claim 11.

18. A computer system having one or more computer processors and memory configured to perform the method of claim 11.

* * * * *

UNITED STATES PATENT AND TRADEMARK OFFICE
CERTIFICATE OF CORRECTION

PATENT NO. : 12,277,870 B2
APPLICATION NO. : 17/809217
DATED : April 15, 2025
INVENTOR(S) : Saad Masood Khan et al.

Page 1 of 1

It is certified that error appears in the above-identified patent and that said Letters Patent is hereby corrected as shown below:

In the Claims

At Column 23, Line 25 (Claim 1, Line 15):
"similar item groups to by ordering the model knowledge"
Should be:
--similar item groups by ordering the model knowledge--

Signed and Sealed this
Fifteenth Day of July, 2025

Coke Morgan Stewart
*Acting Director of the United States Patent and Trademark Office*